G. A. AMBLER.
MACHINE FOR INSERTING PROTECTORS.
APPLICATION FILED NOV. 9, 1903.

995,050.

Patented June 13, 1911.
9 SHEETS—SHEET 3.

Witnesses:
Fred S. Greenleaf.
Claude W. Lunsford

Inventor.
George A. Ambler,
By Bradley Gregory.
attys.

G. A. AMBLER.
MACHINE FOR INSERTING PROTECTORS.
APPLICATION FILED NOV. 9, 1903.

995,050.

Patented June 13, 1911.

G. A. AMBLER.
MACHINE FOR INSERTING PROTECTORS.
APPLICATION FILED NOV. 9, 1903.

995,050.

Patented June 13, 1911.
9 SHEETS—SHEET 5.

Witnesses:

Inventor,
George A. Ambler,

G. A. AMBLER.
MACHINE FOR INSERTING PROTECTORS.
APPLICATION FILED NOV. 9, 1903.

995,050.

Patented June 13, 1911.

G. A. AMBLER.
MACHINE FOR INSERTING PROTECTORS.
APPLICATION FILED NOV. 9, 1903.

995,050.

Patented June 13, 1911.

Witnesses:
Fred L. Grintkof.
Claude W. Linsford.

Inventor.
George A. Ambler,
by Crosby Gregory,
attys.

G. A. AMBLER
MACHINE FOR INSERTING PROTECTORS.
APPLICATION FILED NOV. 9, 1903.

995,050.

Patented June 13, 1911.

UNITED STATES PATENT OFFICE.

GEORGE A. AMBLER, OF WINCHESTER, MASSACHUSETTS, ASSIGNOR TO UNITED SHOE MACHINERY COMPANY, OF PATERSON, NEW JERSEY, AND BOSTON, MASSACHUSETTS, A CORPORATION OF NEW JERSEY.

MACHINE FOR INSERTING PROTECTORS.

995,050.   Specification of Letters Patent.   Patented June 13, 1911.

Application filed November 9, 1903. Serial No. 180,296.

*To all whom it may concern:*

Be it known that I, GEORGE A. AMBLER, a citizen of the United States, and resident of Winchester, county of Middlesex, State of Massachusetts, have invented an Improvement in Machines for Inserting Protectors, of which the following description, in connection with the accompanying drawings, is a specification, like letters on the drawings representing like parts.

This invention relates to machines for inserting protectors and fastenings or slugs into the soles and heels of boots or shoes, although some features of the invention are applicable to other types of machines intended for other uses. These protectors and slugs increase the durability of the stock, which may be heel or sole, and also ornament the stock.

The machine herein shown is arranged to drive protectors having laterally extending wings and to drive fastenings or slugs between the wings of the protectors. The fastenings are moved by a fastening-carrier into a space or recess cut in one side of a hollow protector-driver bar, while a fastening-driver occupies its elevated position, and thereafter the fastening-carrier is made to descend with the protector-driver, and the fastening-driver drives the fastening from said carrier through the protector-driver into the stock.

One important feature of the invention consists of the combination in one machine of mechanism for inserting protectors, with mechanism for driving fastenings or slugs into the stock adjacent to the protectors.

Other features and objects of the invention will be set forth in the following description and claims.

The specification describes and the drawing illustrates mechanism for sustaining a pattern-plate on which rests the stock while the protectors, and fastenings or slugs are driven thereinto, and means for moving the pattern plate into and locking the same in its operative position, but such mechanisms are not herein claimed, as the same form part of divisional application Serial Number 393,477 filed on the 18th day of September A. D. 1907.

In the drawings Fig. 3 is a detail showing part of the device employed for feeding the pattern-plate; Fig. 4 is a left hand side elevation of the machine shown in Fig. 1; Fig. $4^a$ shows the pattern-plate locking device detached; Fig. 10 is a partial vertical section taken through the center of the machine, as indicated by the line $x^2$, Fig. 8; Figs. 11 and 12 are details showing the ejector in two different positions, and parts of the protector raceway and protector-carrier, a protector being shown in each figure; Fig. 13 is a detail of the arrester; and Fig. 14 is a detail of the let-off for controlling the positions of the protectors on the protector-raceway; Figs. $14^a$ and $14^b$ are details of part of the mechanism for moving the slide-bar $D^7$.

Referring to the drawings, A represents a column having a suitable foot to stand on the floor, the column having a hollow post $A'$, see Fig. 25, that sustains the spindle B for supporting the table $B^7$ over which is moved the pattern-plate to be hereinafter referred to and made subject of claims in said divisional application Serial Number 393,477.

The head $A^2$ of the column is of proper shape to sustain the operating parts to be described. An overhanging part of the head has attached to it, by screws $A^4$, see dotted lines Fig. 4 and full lines Figs. 15 and 16, a block $A^5$ having an extension $A^6$ to which is secured by screws 2 a throat or foot-plate $A^7$, shown chiefly by dotted lines in Figs. 15 and 16.

The head has a main shaft $B^6$ provided with a fast friction disk $E^{10}$ and a continuously rotated loose pulley $E^{9x}$ under the control of a wedge $e$ that when moved in usual manner by the lever $H^5$ pivoted at $H^6$ and having a rod $H^{5x}$ connected with a starting treadle, not shown, but commonly used in mailing machines, couples the two pulleys so that the shaft will be rotated to enable protectors and fastenings or slugs to be driven, as will be described. The loose pulley has a connected belt pulley $E^9$ that drives a crossed belt $E^8$ extended over a pulley $E^7$ on a shaft $E^5$, rotatable in a bearing $E^6$ at the top of the head. The shaft $E^5$ in practice has at one end the movable part $E^4$ of the protector hopper having usual shelves to pick up the winged protectors 10 and deposit them on the protector raceway $a$ having the usual cover $a'$, to be delivered, as will be described to a protector carrier.

Figures 3, 4, 4A:
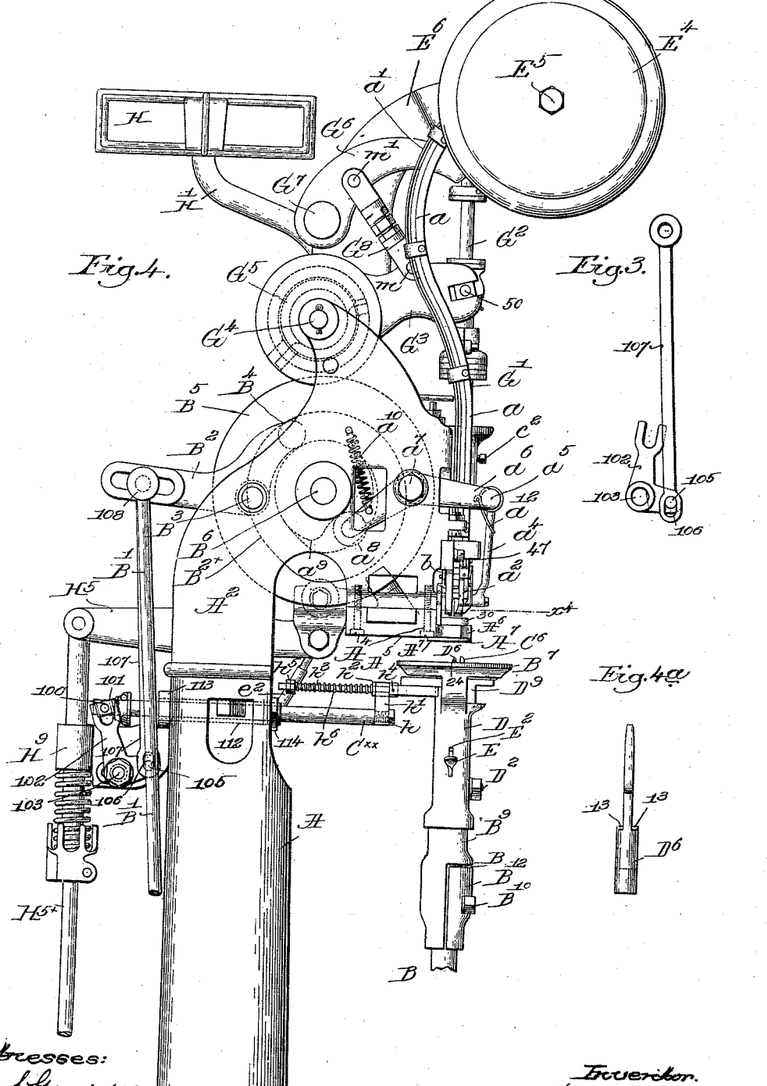
Figures 5, 6, 7:
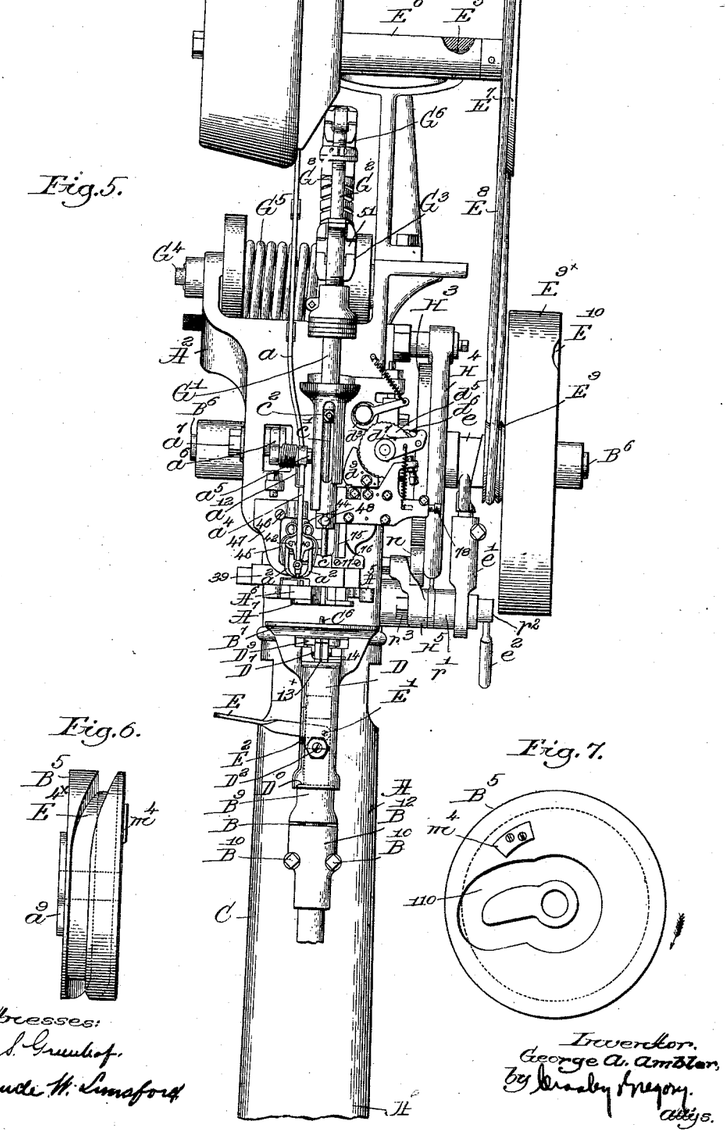
Fig. 5 is a front elevation of the machine shown in Fig. 1.
Fig. 6 is an edge view of the cam for moving the protector-carrier and actuating the driver and the ejector.
Fig. 7 is a side view of the cam shown in Fig. 6 looking at the same from the right.
Figure 25:
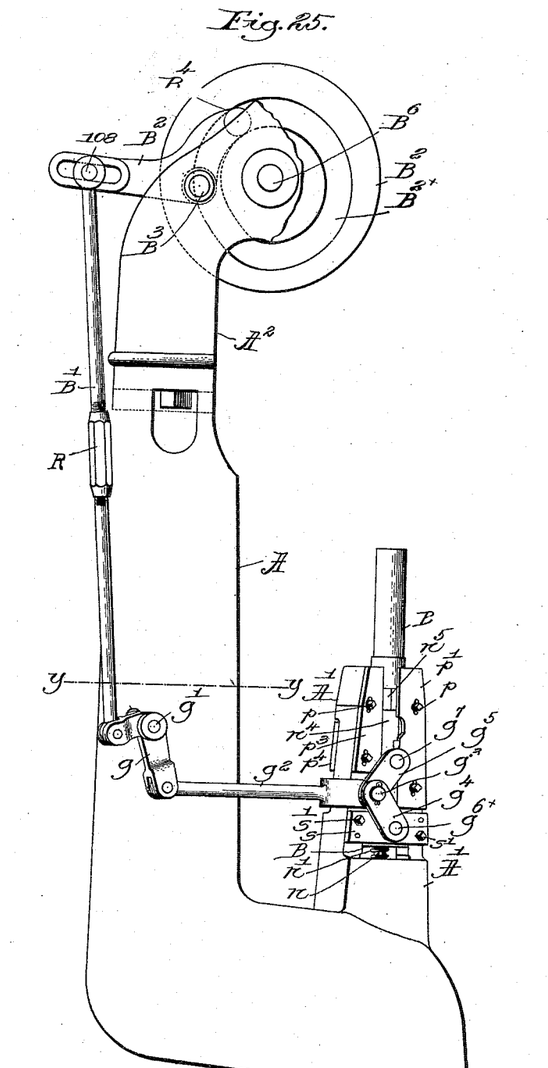
Fig. 25 shows in left hand side elevation a part of the head and column with the cam-shaft and cam to move the lever $B^2$ and the parts actuated thereby to raise and lower the spindle carrying the work-support or table.

The main shaft has a cam $B^5$, shown detached in Figs. 6 and 7, provided at its periphery with a cam-groove $E^{4x}$ for moving the protector carrier, at its right hand side with a cam groove 110 for actuating positively the lever $G^3$ more fully described hereafter for moving the protector driver bar $G'$, and at its left hand side, see Fig. 4, with a cam groove $B^{2x}$ that receives a roller stud $B^4$ of a lever $B^2$ pivoted at $B^3$ and receiving in a slot at the outer end thereof a stud 108 on which is hung a rod $B'$ connected at its lower end with an elbow lever $g$ pivoted at $g'$ on the column A, see Fig. 25, the operation of said lever and link being fully described in said divisional application, it being understood that the post B is raised and lowered at suitable times to effect the clamping and releasing of the stock, the pattern-plate being moved over the table when the stock is released and remaining stationary with the stock clamped while the protectors and fastenings are being driven.

Figures 1, 2:
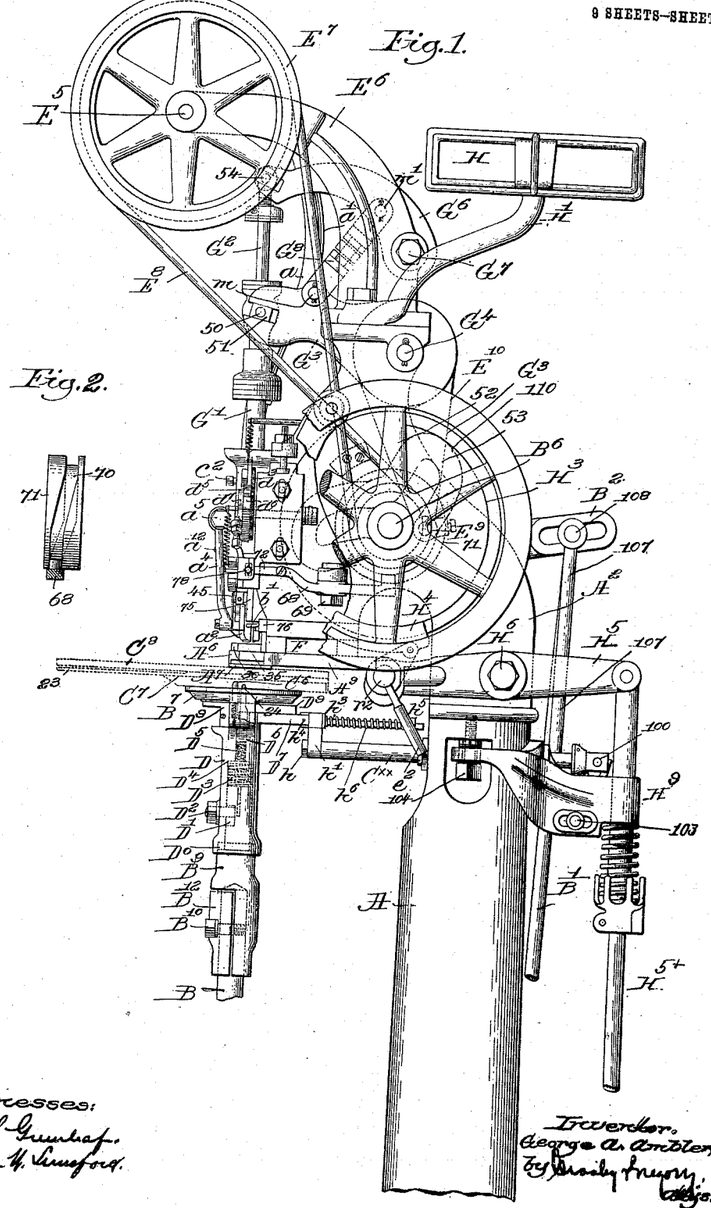
Figure 1 is a right hand side elevation of the upper part of a machine embodying my invention in one of the best forms now known to me.
Fig. 2 is a detail showing the cam and part of the lever operated thereby for moving the actuator for the fastening-carrier.
Figures 10, 11, 11A, 12, 13, 14, 14A:
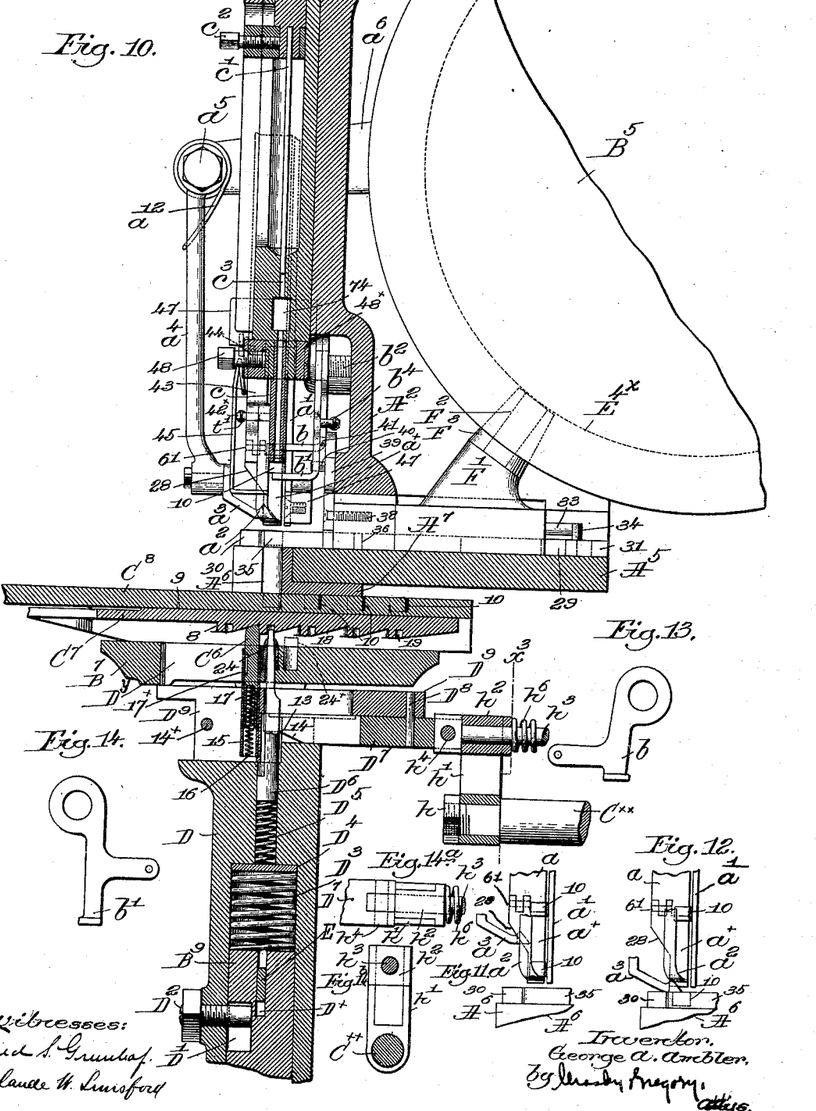

The spindle B, see Fig. 1, has secured to it by a clamping-block $B^{12}$ and clamping screws $B^{10}$, a stock-support holder $B^9$ having a shoulder $D°$, as shown in said figure, a notch $D'$ and a slot $D^x$, see Fig. 10. The holder $B^9$ is embraced loosely by the hollow shank D of a stock-support or table $B^7$. The upper end of the holder $B^9$ serves as a rest for a spiral spring $D^3$ that through a buffer-plate $D^4$ sustains the support or table $B^7$, and a stud $D^2$ in said shank entering the notch $D'$ limits the extent of upward movement of the table on the holder. The shank D has a slot $E^2$, see Fig. 4, through which is inserted a hand operated lever E, the inner end of said lever being pivoted at $E'$, Fig. 5, in the slot $D^x$ of the holder. To lower the table $B^7$ from the throat or foot-plate for the introduction or removal of a pattern-plate $C^7$ fully described in said divisional application, the free end of lever E will be depressed, and said lever by contact with the bottom of the slot $E^2$ will carry the shank D downwardly and compress the spring $D^3$. The shoulder $D°$ will preferably limit the descent of the shank and thus avoid wear on the stud $D^2$.

Figure 17:
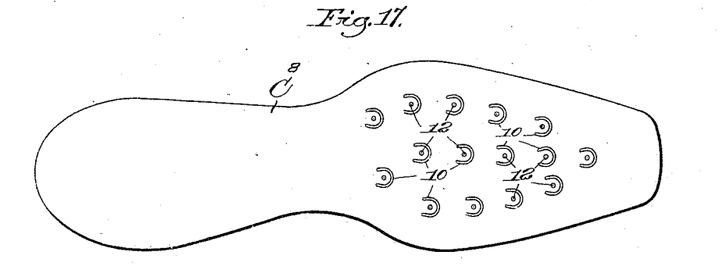
Figs. 17 and 18 show stock represented as soles in which the protectors have been driven in accordance with a predetermined pattern, the figures also showing fastenings inserted in the stock within the protectors.
Figure 18:
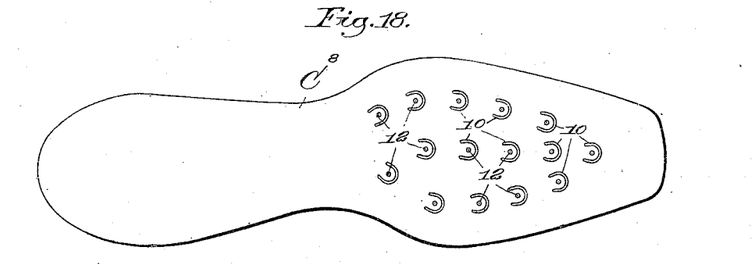

The buffer-plate $D^4$ sustains a smaller spiral spring $D^5$ on which rests the lower end of a pattern-plate locking device $D^6$ having shoulders 13, see Fig. 4ª. This locking device is free to be slid in a guide pin 24 held in the table $B^7$, and adapted to enter either of the grooves 20, 21 or 22 in the pattern-plate $C^7$. The pattern-plate has at its upper side pins 9 on which is impaled the stock $C^8$ which may be a sole, in which the protectors and fastenings or slugs are to be driven, as shown in Figs. 17 and 18, or in any other form according to the particular shape of the grooves in the underside of said plate. The bottom of the grooves have a series of inclines 18, provided with holes 19 and presenting shoulders 8. The locking device engages at times the holes 19, and a feeding device $C^6$ engages at times the said shoulders one after the other. The feeding device $C^6$ sustained by a spring 15, see Fig. 10, resting on a shoulder 16 of a feed block $D^8$, enters loosely a tube 17 held in the inner end of a slot $13^x$, see Fig. 24, of said feed block by a clamping screw $14^x$, said tube projecting upwardly into an opening $D^y$ in the table $B^7$.

Figure 22:
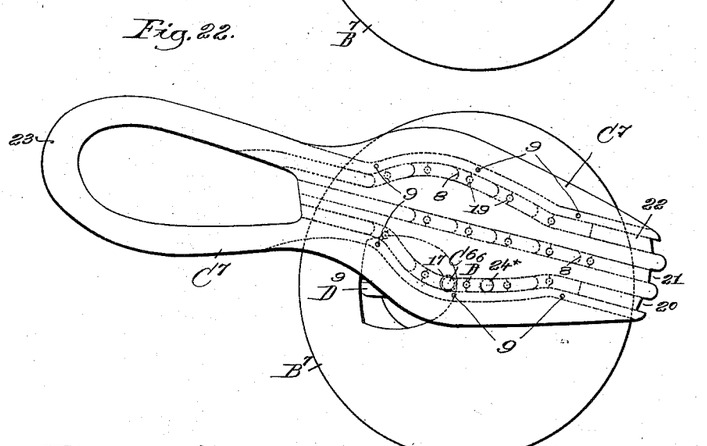
Fig. 22 is a view similar to Fig. 21 but with both guide-pins in operative position.

The escape of the feeding device from the tube is prevented by a pin $17^x$ in the tube 17 entering a notch, see Fig. 10, in the side of the feeding device. Sometimes I may provide the table with a second guide-pin 24ˣ, as shown by dotted lines in Fig. 22, it being used for a purpose fully described in said divisional application.

Figures 23, 24:
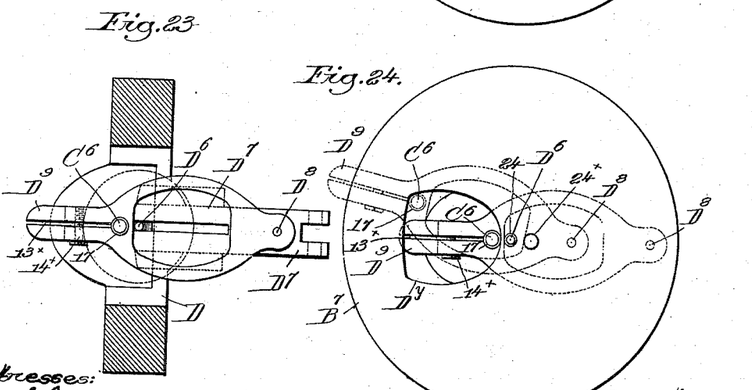
Fig. 23 is a section below the line $x^5$, Fig. 8, the parts being shown in the position they will occupy when the central groove of the pattern-plate is being used.
Fig. 24 is a view below the dotted line $x^6$, Fig. 8, the dotted lines showing the parts in the position they will occupy when one of the curved side grooves of the pattern-plate is being used.

The feed-block is pivoted at $D^8$ on a slide-bar $D^7$ forked at its end, see Figs. 10 and 23, to embrace the locking device and having inclined faces 14 to act on the shoulders 13 thereof and depress the locking device against the spring $D^5$ and withdraw said device from a hole 19 to unlock the pattern plate. The slide-bar $D^7$ derives its movement from the lever $B^2$ described, and a connecting rod 107, shown detached in Fig. 3, hung on the stud 108 with which is connected the rod $B'$ before described. The rod 107 has an elongated slot 106 at its lower end that embraces a stud 105 extended from a lever 102, pivoted at 103, see Fig. 4, on a bracket $H^9$ connected, as shown in Fig. 1, with the column by a bolt 104.

The forked end of the lever 102 embraces a swivel-block 101 mounted on a stud 100 at the outer end of a rod $C^{xx}$ with which is connected by a screw $h$ a forked arm $h'$ that embraces the sides of a block $h^2$ surrounding loosely a rod $h^3$, see Fig. 10, united by a pin $h^4$ to the outer end of the slide-bar $D^7$. The rod $h^3$ has at its end a nut $h^5$ and is surrounded between the block and nut by a spiral spring $h^6$ that yields in case the feeding movement of the pattern-plate is for any reason obstructed, thus obviating breaking of the parts.

The movement of the slide-bar $D^7$ toward the front of the machine, or to the left, Fig. 10, takes place while the spindle B is held up by its actuating devices described in said divisional application, and while the stress of the spring $D^3$ is temporarily increased and the protector and fastening or slug is being driven into the stock. As the slide-bar is moved in this direction, the inclined faces 14 acting on the shoulder 13 withdraw the locking device from a hole 19 in the pattern-plate, and thereafter in its further or final movement in the same direction the inclined upper end of the spring-sustained feeding device will slide off that one of the inclines 18 behind the incline having the hole from which the locking device was just withdrawn, said feeding device at the end of its movement toward the front of the machine under the action of spring 15 snapping behind the shoulder 8 of said incline. When the direction of movement of the slide-bar is changed, that is when the bar is moved backwardly from the front of the machine, the feeding device by its engagement with the said shoulder imparts to the pattern-plate its feeding movement which takes place while the drivers are being elevated. The elongated hole 106 in the rod 107 affords sufficient lost motion to enable the table $B^7$ to rise fully and clamp the stock in position for the reception of a protector before the slide-bar $D^7$ starts to move toward the front of the machine to engage a different shoulder of the pattern-plate. As the slide-bar and feed-block complete their movement to the right, Fig. 10, to feed the pattern-plate, the inclined faces 14 retire from the shoulders 13 of the locking device, and permit the latter to rise under the action of spring $D^5$, and enter a different hole 19 in the pattern-plate to hold the latter while another protector and slug are driven.

Figure 19:
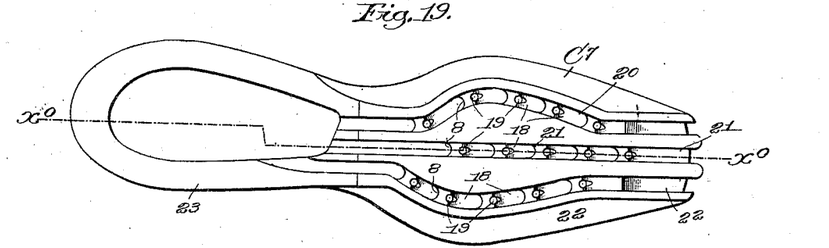
Fig. 19 is an underside view of a pattern-plate of one desirable construction, the pattern being intended to produce the arrangement of protectors represented in Figs. 17 and 18.
Figure 20:
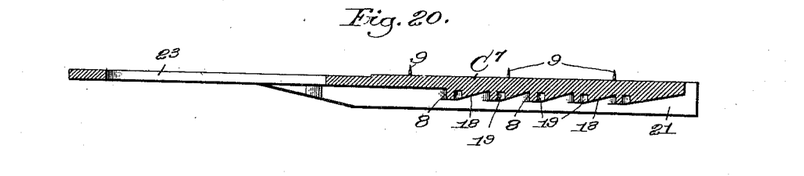
Fig. 20 is a section in the line $x^6$, Fig. 19.
Figure 21:
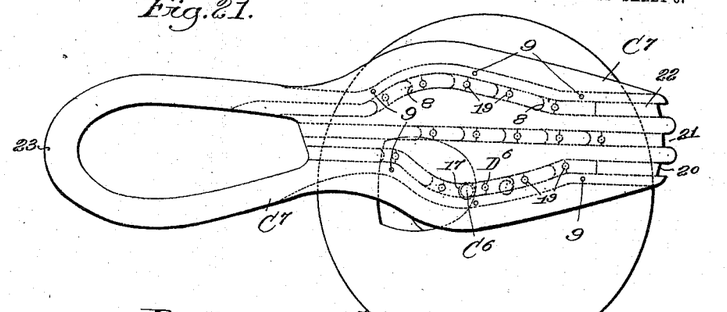
Fig. 21 represents the pattern-plate of Fig. 19 right side up with the stock removed, showing a single guide-pin in operative position in the outer guiding-groove of the pattern-plate.

The particular shape of the grooves in the pattern-plate may be varied according to the outline or design in which it is desired to insert the protectors and fastenings or slugs. The grooves shown in Fig. 19 are adapted to insert them in accordance with the design represented in Figs. 17 and 18, but it will be seen in Fig. 18 that the open ends of the outside row of protectors occupy different positions from the same protectors represented in Fig. 17.

When driving the protectors according to the design represented in Fig. 18, both guides 24 and 24ˣ will be used, but in case it is desired that the open ends of the protectors stand in substantially the same position throughout driving the entire lot of protectors,—and I find this to be preferable—, then one of the guides, as 24ˣ, may be omitted, and the workman taking hold of the extended end 23 of the pattern-plate may swing said plate more or less to one side on the guide 24 to insure the insertion of the protectors with their open ends in the desired line.

The bar $D^7$ has a movement only in a right line, but the feed-block $D^9$ being pivoted to said bar by the pin $D^8$ may be moved in the arc of a circle about said pin, as represented by dotted lines in Fig. 24.

When the protectors are being inserted in a straight line, as represented in the center row of protectors in Figs. 17 and 18, then the feed-block $D^9$ will occupy the position shown by full lines in Figs. 23 and 24, but when protectors are being inserted in other than a straight line, as represented by the outer rows of protectors in the stock, Figs. 17 and 18, then the block $D^9$ in its movement will be swung by hand about the pivot $D^8$, as indicated by dotted lines Fig. 24, to cause the feed device $C^6$ to engage the proper shoulders of the pattern-plate to reciprocate it step by step in spacing the protectors.

Figure 15:
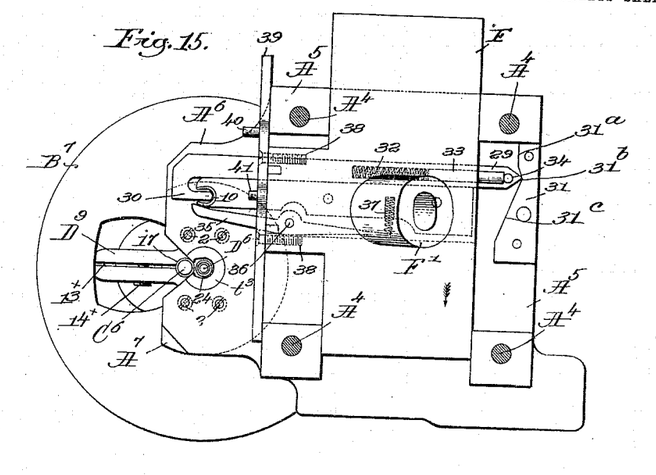
Figs. 15 and 16 are plan views below the dotted line $x^4$, Fig. 4, chiefly to show the protector-carrier in different positions.

The bushing $t^3$ of the throat-plate, see Fig. 15, through which each protector passes when being driven, is unchangeable in its position, and consequently each protector passes through said throat in exactly the same position, but by feeding the stock, as described, under said throat the protectors may be inserted with their open ends in any desired position.

The lower end of the protector raceway $a$, provided with protectors from the hopper, has a pivoted delivery end $a^x$, shown enlarged in Figs. 11 and 12. Fig. 11 shows a protector thereon, and the endmost protector rests on a protector sustainer comprising spring-actuated fingers $a^2$ pivoted respectively at 42 and $42^x$, see Fig. 8, to the jaws 43, hereinafter described. A spring 45 tends to keep the ends of said fingers against the sides of said delivery end.

The ejector $a^3$ is shown as a curved finger fixed to the lower end of a lever $a^4$ pivoted at $a^5$ on a lever $a^6$, see Fig. 4, pivoted at $a^7$ and having at its inner end a roller-stud $a^8$ that is acted upon by a cam $a^9$, shown by dotted lines in said Fig. 4, fast on shaft $B^6$. The roller-stud $a^8$ is kept against the periphery of the cam $a^9$ by a spring $a^{10}$, and the ejector is yieldingly actuated by said spring to force the endmost protector between the fingers $a^2$ into the protector space, to be described, in the protector-carrier, as represented in Fig. 12. The rising movement of the ejector to place it above a protector sustained by the fingers is effected by the cam $a^9$, and during this movement a spring $a^{12}$ carried by the lever $a^6$ and engaging the lever $a^4$ acts to keep the acting end of the ejector in contact with an incline 28 at the outer surface of the delivery end $a^x$ of the protector raceway. The acting end of the ejector is notched to embrace the delivery end $a^x$, and said end is pivoted at 61 to the end of the raceway $a$, so that in case a protector leaving the end of the raceway should fail to enter properly the space in the protector carrier, to be described, or if the protector should be caught by the carrier while it is still on the raceway, said end will turn and prevent breaking of the parts.

To retain the delivery end $a^x$ yieldingly in line with the main body of the raceway $a$, two jaws 43 are employed, each pivoted at 44 to the stationary bracket 47, the lower end of each jaw being yieldingly held in engagement with said delivery end by the spring $t'$ connected at either end with said jaws.

Figure 8:
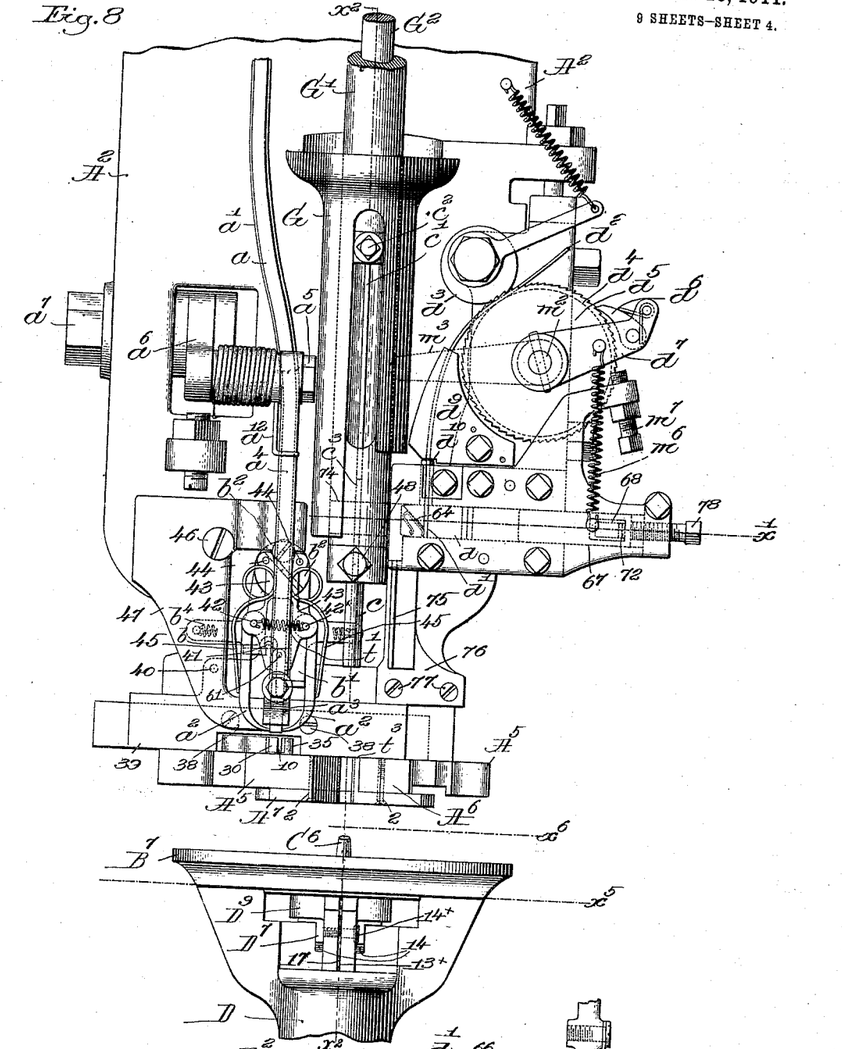
Fig. 8 is an enlarged front elevation of a portion of the machine shown in Fig. 5.

The protector raceway has co-acting with it a let-off $b'$ pivoted on the shank of a screw $b^2$, see dotted lines Fig. 8, connected with a part of the head $A^2$; said screw also serves as a support for an arrester $b$, the let-off and the arrester being connected by a spring $b^4$, shown partially in Fig. 8, that acts to keep the end of the let-off and the arrester in contact with the raceway. The let-off $b'$ acts normally to sustain the lower edge of that protector next back of the one sustained by the fingers $a^2$ and next to be removed by the ejector, and the arrester acts against the side of that protector next above the one sustained by the let-off.

Figure 16:
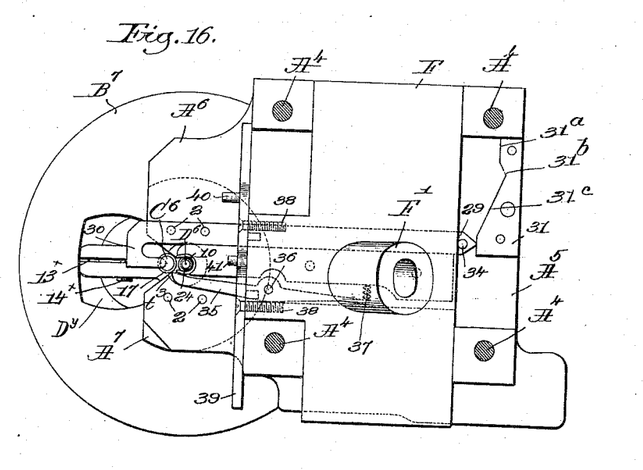

The endmost protector 10 acted upon by the descending ejector is pushed from the delivery end $a^x$ of the raceway immediately into the protector receiving space of the protector carrier F, see Figs. 15 and 16.

The carrier is represented as a plate F guided by the block $A^5$ to which the foot plate $A^7$ is connected. Said carrier has a hollow hub $F'$ that receives a stud $F^2$ shown by dotted lines in Fig. 10, and over which is fitted loosely a roller $F^3$ which enters a cam groove $E^{4x}$ in the cam $B^5$ before described, said cam groove being of a shape to reciprocate the carrier to and fro that the carrier, after a protector has been deposited in the protector receiving space, may be moved from the protector raceway into position under the protector driver, see Fig. 16.

The protector carrier has a groove at its underside to receive the shank 29 of a tongue or inner guide 30. The end of the shank is tapered or rounded to ride over the inclined faces of a block 31 fixed to the block $A^5$, said shank being maintained in contact with said inclined faces by means of a spring 32 inserted in a hole made in the carrier F above the groove containing the shank 29, said spring acting upon a plunger 33 and moving said plunger backwardly against a pin 34 projecting upwardly from the shank 29.

The mechanism just described is so arranged that the tongue 30 occupies a position in the protector space of the carrier so as to be straddled by a protector when it is forced by the ejector into the protector space. At such times the end of the shank 29 engages the part $31^a$ of the block 31.

As the carrier is moved toward the right into position for the protector to be driven, the end of the shank 29 moves from the part $31^a$ to the point $31^b$ of the block 31, causing the tongue 30 to enter farther into the protector space and force the protector against the walls of said space, thus seating it properly, see Fig. 15. Further movement of the carrier toward the right causes the shank 29 to ride up the inclined face $31^c$ and withdraw the tongue 30 from between the wings of the protector and out of the way of the driver.

The protector carrier has a finger 35 pivoted at 36 and acted upon by a compressed spring 37 that normally keeps the outer or left hand end, viewing Fig. 15, of the finger against one end of one wing of the protector, to aid in keeping the protector seated in the protector space.

The carrier F has connected to it by screws 38 a plate 39 having projections 40 and 41, see Figs. 15 and 16, the projection 41 occupying a position in a plane above the projection 40, see Fig. 8. The projection 40 as the carrier is moved to the right, viewing Fig. 8, meets the let-off $b'$, and moves the same away from the raceway against the action of the spring $b^4$, so that the protector sustained by the let-off, may drop onto the fingers $a^2$ of the sustainer. When the carrier F is moved to the left the projection 41 moves the arrester $b$ away from the raceway, so that the protector then held by it may drop therefrom and be caught by the let-off.

The mechanism above described for taking the protectors from bulk and carrying them into position to be driven is not of my invention, but is the same as heretofore used in machines for inserting protectors. Such mechanism is not therefore specifically claimed herein, but some of it is claimed in combination with other novel mechanism hereinafter described.

To drive a protector and a fastening or slug I have devised novel means which I will now describe.

The head is provided with a passageway to receive a protector-driver-bar G', represented, see Fig. 10, as hollow and having a hollow protector driver C connected to the lower end thereof by a screw 48 in a collar $48^x$. The protector driver-bar receives in a smaller part $c^3$ of its longitudinal bore the fastening or slug driver $c'$ held in the fastening or slug driver-bar $G^2$ by a clamp having a clamp-screw $c^2$. These two driver bars are concentric, one works inside the other, the fastening-driver is freely movable into and through the protector-driver, and, as shown in Figs. 8 and 10, the protector-driver bar G' is provided with a longitudinal slot through which the clamp screw $c^2$ of the fastening driver-bar extends.

The protector driver-bar G' carries near its upper end, see Fig. 1, two studs 50 on which are pivoted two swivel blocks 51 which are embraced by the forked ends of a positively actuated driver-lever $G^3$, shown by dotted and full lines in Fig. 1. This lever is pivoted on a stud $G^4$, and has at its inner end a roller stud that enters a cam-groove 110 in one side of the cam-hub $B^5$. A spring $G^5$ of usual construction assists in depressing the protector driver-bar.

The fastening driver-bar $G^2$ at a point above the upper end of the protector driver-bar has a stud 54, see dotted lines Fig. 1, which is embraced by the forked end of a lever $G^6$ pivoted at $G^7$, said lever deriving its movement from the lever $G^3$ through a link $G^8$, shown mostly by dotted lines in Fig. 1, and by full lines in Fig. 4. Said link is composed of a plurality of parts pivoted at $m$ and $m'$, see Fig. 4, to said levers, and adjustable to lengthen or shorten the link $G^8$ to regulate the movement of the fastening driver-bar $G^2$ with relation to protector driver-bar G'.

The pivot $m'$ of link $G^8$ is arranged closer to the fulcrum $G^7$ of the lever $G^6$ than the pivot $m$ from the fulcrum $G^4$ of the lever $G^3$. The object of this arrangement is to raise the fastening driver faster and farther than the protector driver to thereby raise the lower end of the fastening driver $c'$ above a space or recess 74 in the protector driver-bar and thus permit the movement out of and into that space of a fastening carrier $d$. Another advantage of this construction is that, while the strokes of the drivers end at the same time, yet in the movement of said drivers toward the stock the protector driver is ahead of the fastening-driver and thus the fastening is guided in the protector driver during a portion of its movement into the stock.

Figure 9:
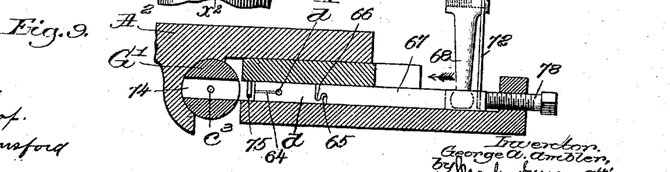
Fig. 9 is a sectional detail below the line $x'$, Fig. 8.

The fastening-driver $c'$ is adapted to act upon and drive a fastening from the fastening carrier $d$, shown best in Fig. 9, as a block having a hole $d'$ into which may be projected, by any usual wire-feeding mechanism, a wire $d^2$. Said wire-feeding mechanism is herein shown as a pressure wheel $d^3$, and a sustaining wheel $d^4$, see dotted lines Fig. 8. The sustaining wheel has imparted to it an intermittent movement through a ratchet wheel $d^5$ acted upon by a suitable pawl $d^6$ carried by an arm $d^7$ fast on a rock-stud $m^2$, the latter having extended from it, see dotted lines Fig. 8, an arm $m^3$ that is acted upon at each rotation of the cam $B^5$ by a projection $m^4$ carried thereby. A spring $m^6$ acts normally to move the lever and pawl backwardly over the ratchet teeth, and an adjustable stop $m^7$ determines the extent of such backward movement. The wire is fed through a hole in an apron $d^9$ and thence through a suitable steel-block or die $d^{10}$, which acts as a guide for the wire as it enters the hole $d'$ in the fastening carrier $d$. This die $d^{10}$ also acts to shear the wire as the carrier $d$ moves toward the space or recess 74 in the protector driver-bar.

The fastening carrier has connected with it a friction device 64, see Figs. 8 and 9, shown as a spring confined in a slot in the left hand end of the fastening carrier. Said friction device acts against the end of the wire as it is inserted in the hole $d'$ and sustains and retains in said carrier the fastening made by cutting off the end of the wire, until the fastening is driven from the carrier by the driver $c'$.

One end of the carrier, as best shown in Fig. 9, is provided with a lip 65 adapted to be engaged by a corresponding lip 66 at the end of the actuator 67 having at its opposite end, as shown by dotted lines Fig. 9, an opening to receive the end of a lever 68 mounted to turn about a stud 69, see Fig. 1, sustained in the head, the outer or right hand end of said lever having a roller to enter the cam groove 70 in the cam-hub 71 fixed to the main shaft $B^6$, said cam-hub being shown detached in Fig. 2. The end of the lever 68, in engagement with the actuator 67, is provided with a spring 72 which also enters the opening in said actuator.

When the lever 68 is moved in the direction of the arrow Fig. 9, the end of the lever contacting with the shoulder of the actuator moves the fastening carrier $d$ to the left into the space 74 in the bar G'. The stroke of the actuator 67 to the left, Fig. 9, is always to an exact point, and puts the carrier into the space 74, this being done while the fastening driver $c'$ occupies its elevated position shown in Fig. 10. As the protector driver-bar G' descends it takes with it the fastening carrier, and the tongue 65 thereon engages a guide 75 forming part of a plate 76 secured to the head by screws 77, see Fig. 8, said guide serving as a track and holding and positioning the fastening carrier $d$ with its hole $d'$ exactly in line with the hole $c^3$ in the protector driver-bar which constitutes the driver-passage for the fastening-driver $c'$. While the bars G' and G² are lowered to drive the protector and the fastening, the actuator 67 remains in the position that it occupied when the fastening carrier was taken from the lip or tongue 66 at the end thereof, said end being exactly in line with the guide 75. When the bar G' is elevated the fastening-carrier moves upwardly over the track 75 and is delivered upon the tongue or lip 66 of the actuator, and thereafter the actuator is moved to the right, viewing Fig. 9, by means of the lever 68, to place the fastening carrier in position to receive the wire for another fastening.

The distance which the actuator is moved to the right may be varied in order to position properly the hole $d'$ in the carrier with relation to the wire-passage in the guide $d^{10}$, by adjusting the stop-screw 78 which bears against one end of the actuator. In order that the actuator may always be moved far enough to the right to engage the stop-screw 78 a spring 72 is fastened to the lever 68 and engages one end of the slot in the actuator, as shown in Fig. 9.

The wire $d^2$ for forming the fastenings will be taken from a reel H of usual construction mounted upon an arm H'.

The term "fastening" as used in the claims is meant to include either a fastening for uniting pieces of stock together or a slug for ornamenting and increasing the durability of the stock. Moreover the term "fastening driver" may be used broadly in one or more of the following claims to cover both a driver which is especially adapted to drive protectors and a driver suitable for driving any other form of "fastening."

The shaft B⁶ has connected with it a brake-wheel H³ which is acted upon by a brake H⁴, see Fig. 1, controlled by the lever H⁵. This brake mechanism forms no part of the present invention.

Sometimes it is desirable that the wedge $e$ surrounding the shaft B⁶ and employed to start and stop the machine, be left in a position to prevent the starting of the machine if the starting treadle should be moved by accident. To provide for this a boss $r'$ at one end of the lever H⁵ is bored to receive an eccentric stud $r^2$ provided with a handle $e^2$. This stud is held in adjusted position by a nut $r^3$ screwed onto one end thereof. The eccentric is embraced by a tubular sleeve $e'$ that has clamped in it the shank of the wedge $e$, and by turning the eccentric through the handle $e^2$ the wedge may be moved and will be put in such position that it cannot be depressed sufficiently to start the machine through the usual starting treadle. This device, however, is of common construction and is not claimed herein.

Having described the parts of the machine, I will now describe the operation of the same in inserting protectors and fastenings.

Assume that the stock-support and spindle are in the position that they occupy for feeding the pattern-plate, that both drivers are elevated, that the protector-carrier is in protector receiving position and has been supplied with a protector, that the carrier to receive the wire for the fastening is in its wire receiving position, and that the workman has applied to the table the pattern-plate containing stock, by passing the free end of one of the slots in the pattern-plate over the guide on said table.

It will be understood that the pattern-plate will be moved from the front of the machine backwardly during the operation of inserting protectors and fastenings. This done, the workman will start the machine through the usual starting lever, and the following operations will take place, viz: the wire will be fed into the fastening carrier by or through the lever $d^7$ actuated by the projection $m^4$ on cam B⁵, the wire will be cut off as the fastening carrier is moved forwardly into the open recess 74 of the protector-driver bar the fastening-driver $c'$ at such time occupying its most elevated position. During this time the protector carrier provided with a protector will be moved to place the protector in the path of movement of the protector driver. This done, the spindle B is pressed upwardly, as fully set forth in said divisional application, to clamp the stock between the pattern-plate and the foot-plate, when the spindle is locked and held locked during the driving of the protector and fastening.

The spindle having been locked the drivers descend through the operation of the actuating mechanism hereinbefore described, and as the protector-driver starts to descend it takes with it the fastening carrier, and the fastening-driver moving downwardly at a faster speed than the protector driver, meets the fastening in the fastening carrier, and drives it through the hollow protector-driver into the stock as the protector-driver in its descent acts upon the end of the protector and drives it into the stock. The protector and fastening having been driven, the drivers are elevated instantly, and the fastening-carrier is withdrawn from the protector driver-bar and returned to its wire-receiving position. During this operation the protector-carrier is returned into position to receive the protector and the ejector immediately acts on the endmost protector resting on the sustainer and forces said protector into the protector space of the protector-carrier, and also during this return movement of the protector carrier the lever B² is moved to release the stock as fully set forth in said divisional application.

Having fully described my invention, what I claim as new and desire to secure by Letters Patent is:—

1. A machine of the class described comprising means for supplying protectors having laterally extending wings, mechanism for successively driving said protectors, means for supplying fastenings and mechanism for successively driving said fastenings arranged to drive a fastening in predetermined coöperative relation to each protector.

2. In a machine of the class described, mechanism for driving a protector having laterally-extending wings, and means for driving a fastening into the stock inside the wings of the protector.

3. In a machine of the class described, the combination with means for supplying protectors and mechanism for driving the same, of independent means for supplying fastenings, and mechanism for driving said fastenings in uniform predetermined relation to said protectors, said protectors and fastenings being driven in succession into the stock.

4. In a machine of the class described, a driver to drive a protector and an independent driver arranged to drive a fastening into the stock inside the protector, combined with means for actuating said drivers independently, one driver working in advance of the other.

5. A machine of the class described, having in combination, means for driving a protector, other means for driving a fastening, one of said means operating in advance of the other, and work feeding means constructed and arranged to operate only after both of said driving means have performed their respective functions.

6. A machine of the class described, having in combination, two fastening drivers, and means for presenting fastenings in position to be operated upon by said drivers, one of said drivers operating in advance of the other and one of said drivers being guided by the other.

7. A machine for inserting into stock fastenings or the like having in combination two driver bars and fastening drivers carried thereby, one of said drivers having a longitudinal passage and the other driver being movable in said passage to drive a fastening within the area of operation of the first mentioned driver and means for presenting fastenings in position for the operation of said drivers.

8. In a machine of the class described, a driver bar having a longitudinal passage, a connected protector-driver also having a longitudinal passage, and a second driver bar movable in the passage in said first-named bar and carrying a fastening-driver movable in the passage in the protector-driver.

9. In a machine of the class described, a protector-driver having a longitudinal passage, means for actuating the protector-driver, a fastening-driver movable in said longitudinal passage, and means for actuating the fastening-driver.

10. In a machine of the class described, two driver bars, drivers carried thereby, one of said drivers having a longitudinal passage and the other driver being movable in said passage, and mechanism for actuating one of the drivers to drive a protector and the other to drive a fastening.

11. In a machine of the class described, two driver bars and drivers carried thereby, one of said drivers having a longitudinal passage and the other driver being movable in said passage, and means for raising said drivers, whereby the last named driver is moved for a greater distance than the first-named driver.

12. In a machine for inserting fastenings, two driver bars, one having a longitudinal passage and the other being movable in said passage, a driver connected with each of said bars, one driver having a longitudinal passage in which the other driver is moved, two levers each connected with one of said bars, mechanism connecting said levers, and means to actuate one of said levers and thereby actuate said driver bars.

13. In a machine of the class described, a driver and a driver bar, each having a longitudinal passage, a second driver and driver bar movable in the longitudinal passages in the other driver and driver bar, two levers, one connected with one and the other with the other of said bars, adjustable means for connecting the two levers, and means for actuating one of said levers.

14. In a machine of the class described, a driver bar and a driver, each having a longitudinal passage, means to place a fastening in line with the passage in said driver, and means to drive said fastening through the passage in said driver.

15. In a machine of the class described, two drivers, driver bars therefor, a fastening-carrier, one of said bars being arranged to receive and move with it said carrier, and means to actuate the other driver bar and driver to drive a fastening from said carrier into the stock.

16. A driver bar having a longitudinal passage, a recess intersecting said passage, a fastening-carrier, means to move said carrier into said recess, a second driver bar having a driver movable in said longitudinal passage, and means to actuate said second driver bar to drive the fastening from the carrier into the stock.

17. In a machine for inserting fastenings, a driver, mechanism for supplying fastening material, a carrier to receive the fastening material and transfer it into position to be driven, and an actuator for moving the carrier between the fastening-supplying mechanism and the path of the driver, the carrier being also movable toward and from the stock at an angle to the path of said first movement.

18. A driver bar and a driver each having a longitudinal passage, a recess intersecting the passage in the driver bar, a fastening-carrier, means to place said carrier in said recess, a guide for said carrier parallel with the path of movement of said bar, means to reciprocate said bar and with it the carrier, and a second driver bar and driver to drive a fastening from said carrier through said longitudinal passages into the stock.

19. In a machine of the class described, a driver, mechanism for supplying fastening material, a carrier to receive the fastening material and transfer it into position to be driven, an actuator with which said carrier is coupled loosely for moving the carrier, and means to detach the carrier from said actuator, move it toward the stock, and guide it in such movement.

20. In a machine of the class described, a driver, mechanism for supplying fastening material and transfer it into position to be driven, an actuator with which said carrier is coupled loosely for moving the carrier, means to detach the carrier from said actuator, move it toward the stock, and guide it in such movement, and thereafter to return the carrier and recouple it with its actuator.

21. In apparatus of the class described, an actuator, a carrier for fastening material adapted to be engaged with and disengaged from said actuator, and a second actuator with which said carrier is adapted to be engaged and disengaged, said carrier and actuators having coöperating means whereby said first actuator engages said carrier with and disengages it from said second actuator and said second actuator engages said carrier with and disengages it from said first actuator, substantially as described.

22. In apparatus of the class described, a reciprocating slide, a carrier for fastening material adapted to be engaged with and reciprocated by said slide, and a reciprocating part having a socket adapted for engaging and reciprocating said carrier in alternation with its reciprocation by said slide, substantially as specified.

23. In apparatus of the class described, a guide, a carrier for fastening material adapted to reciprocate in said guide, a slide adapted for engaging said carrier and reciprocating it in said guide, a cam operated mechanism for reciprocating said slide, a member having a socket with which said carrier is adapted to be engaged, said member moving in a path intersecting said guide, and a cam operated mechanism adapted to reciprocate said member, substantially as specified.

24. In apparatus of the class described, a reciprocating actuator having a socket, a plunger having a pin thereon working in said socket, a carrier for fastening material, and mechanism for engaging and disengaging said carrier in said socket, substantially as specified.

In testimony whereof, I have signed my name to this specification, in the presence of two subscribing witnesses.

GEORGE A. AMBLER.

Witnesses:
GEO. W. GREGORY,
MARGARET A. DUNN.

---

Copies of this patent may be obtained for five cents each, by addressing the "Commissioner of Patents, Washington, D. C."

Correction in Letters Patent No. 995,050.

It is hereby certified that in Letters Patent No. 995,050, granted June 13, 1911, upon the application of George A. Ambler, of Winchester, Massachusetts, for an improvement in "Machines for Inserting Protectors," an error appears in the printed specification requiring correction as follows: Page 8, line 44, after the word "material" the words *a carrier to receive the fastening material* should be inserted; and that the said Letters Patent should be read with this correction therein that the same may conform to the record of the case in the Patent Office.

Signed and sealed this 25th day of July, A. D., 1911.

[SEAL.]

E. B. MOORE,
*Commissioner of Patents.*